(12) United States Patent
Mao

(10) Patent No.: US 12,275,157 B2
(45) Date of Patent: Apr. 15, 2025

(54) METHOD AND ELECTRONIC DEVICE, SYSTEM AND COMPUTER READABLE MEDIUM FOR TIME CALIBRATION

(71) Applicant: ABB SCHWEIZ AG, Baden (CH)

(72) Inventor: Yichao Mao, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 335 days.

(21) Appl. No.: 17/758,958

(22) PCT Filed: Jan. 22, 2020

(86) PCT No.: PCT/CN2020/073894
§ 371 (c)(1),
(2) Date: Jul. 15, 2022

(87) PCT Pub. No.: WO2021/147026
PCT Pub. Date: Jul. 29, 2021

(65) Prior Publication Data
US 2023/0049826 A1 Feb. 16, 2023

(51) Int. Cl.
*B25J 9/16* (2006.01)
(52) U.S. Cl.
CPC .......... *B25J 9/1692* (2013.01); *B25J 9/1697* (2013.01)
(58) Field of Classification Search
CPC . B25J 9/1692; B25J 9/1697; B25J 9/00; B25J 9/16; B25J 13/08; B25J 9/161; B25J 9/1664; G05B 2219/37512; G05B 2219/39057; G05B 2219/40425;
(Continued)

(56) References Cited

U.S. PATENT DOCUMENTS

| 7,151,853 B2 | 12/2006 | Roh et al. |
| 2017/0136626 A1* | 5/2017 | Wang ................. G06T 7/74 |
| 2018/0262656 A1* | 9/2018 | Uchida ................ H04N 5/04 |

(Continued)

FOREIGN PATENT DOCUMENTS

| CN | 104238562 A | 12/2014 |
| CN | 107253190 A | 10/2017 |

(Continued)

OTHER PUBLICATIONS

Wehn, "Ultrasound-Based Robot Position Estimation," Oct. 1997 (Year: 1997).*

(Continued)

*Primary Examiner* — Adam R Mott
*Assistant Examiner* — Byron Xavier Kasper
(74) *Attorney, Agent, or Firm* — Greenberg Traurig, LLP

(57) ABSTRACT

Devices, systems, and methods for time calibration. The method comprises determining a first reference position of a robot in a robot coordinate system based on first feedback information received from the robot; determining an association between the first reference position and first sensing information receive from a sensor; receiving, from the robot, second feedback information associated with a second motion of the robot and, from the sensor, second sensing information associated with the second motion; and determining a time delay between a sensing time point when a sensing position of the robot in the second motion is sensed by the sensor and a recording time point when the sensing position is recorded by the robot in the second motion.

20 Claims, 4 Drawing Sheets

(58) Field of Classification Search
CPC . G06T 7/80; G06T 7/85; Y10S 901/09; G01S 17/894; G06F 3/0418
See application file for complete search history.

(56) References Cited

U.S. PATENT DOCUMENTS

| | | | |
|---|---|---|---|
| 2018/0364731 | A1 | 12/2018 | Liu et al. |
| 2019/0339714 | A1* | 11/2019 | Kwak ................ G01S 5/16 |
| 2020/0238530 | A1* | 7/2020 | Kumagai ............ B25J 19/04 |
| 2021/0027058 | A1* | 1/2021 | Ma .................... G06V 20/20 |

FOREIGN PATENT DOCUMENTS

| | | |
|---|---|---|
| CN | 107256568 A | 10/2017 |
| CN | 107369184 A | 11/2017 |
| CN | 107428009 A | 12/2017 |
| CN | 107443377 A | 12/2017 |
| CN | 107498558 A | 12/2017 |
| CN | 107545591 A | 1/2018 |
| CN | 107808401 A | 3/2018 |
| CN | 108445808 A | 8/2018 |
| CN | 108680196 A | 10/2018 |
| CN | 108731589 A | 11/2018 |
| CN | 108923876 A | 11/2018 |
| CN | 109084746 A | 12/2018 |
| EP | 2728374 B1 | 12/2016 |
| WO | 2016154995 A1 | 10/2016 |

OTHER PUBLICATIONS

International Search Report and Written Opinion, issued by the ISA/CN National Intellectual Property Administration; regarding corresponding patent application Serial No. PCT/CN2020/073894; dated Oct. 28, 2020; 8 pages.

* cited by examiner

METHOD AND ELECTRONIC DEVICE, SYSTEM AND COMPUTER READABLE MEDIUM FOR TIME CALIBRATION

CROSS-REFERENCE TO RELATED APPLICATIONS

This is a national stage application which claims priority to International patent application Serial No.: PCT/CN2020/073894, filed 22 Jan. 2020; and which is herein incorporated by reference in its entirety.

FIELD

Embodiments of the present disclosure generally relate to a method, an electronic device, a system and a computer readable medium for time calibration.

BACKGROUND

A vision-guided motion is an effective technical means in automatic control, which improves the flexibility of the process of the control. A calibration procedure is one of the important aspects for the vision-guide motion. An expected calibration procedure may provide an accurate conversion between image data and robot motion.

A conventional way for the calibration procedure may require a calibration of inner parameters of a vision sensor, for example a camera, including the distortion, the focus and the image center of the vision sensor. Furthermore, a further calibration of the external parameter of the vision sensor including the position and orientation of the vision sensor in a tool coordinate system or a world coordinate system.

SUMMARY

Embodiments of the present disclosure provide a method, an electronic device, a system and a computer readable medium for time calibration.

In a first aspect, a method for the time calibration is provided. The method comprises The method comprises determining a first reference position of a robot in a robot coordinate system based on first feedback information received from the robot, the robot obtaining the first feedback information by recording a first motion of the robot; determining an association between the first reference position and first sensing information receive from a sensor, the sensor obtaining the first sensing information by sensing the first motion; receiving, from the robot, second feedback information associated with a second motion of the robot and, from the sensor, second sensing information associated with the second motion; and determining, based on the association, the second feedback information and the second sensing information, a time delay between a sensing time point when a sensing position of the robot in the second motion is sensed by the sensor and a recording time point when the sensing position is recorded by the robot in the second motion.

In this way, a time difference between a sensing time point and a recording time point can be determined. The time point when the robot reaches a sensing position may be recorded by a vision sensor senses as a sensing time point. The recording time point may characterize an actual time point when the robot reaches the sensing position. Therefore, the error between a position of the robot indicated in the sensing image and the actual position of the robot may be eliminated, which may lead an accurate subsequent estimation procedure.

In some embodiments, the method may further comprise triggering the robot to perform the first motion including at least one of an orthogonal motion and a rotation motion.

In some embodiments, determining the association may comprise obtaining a first set of coordinate parameters in the robot coordinate system from the first feedback information, the first set of coordinate parameters representing the first reference position of the robot; determining a set of characteristic data associated with the robot from the first sensing information; and determining the association between the first set of coordinate parameters and the set of characteristic data.

In this way, an association between a position of the robot observed by the sensor and reflected in the sensing image and a set of positioning parameters of the robot fed back from the robot itself may be established. Specifically, by means of the orthogonal motion the robot may determine a relationship between a feature position in the sensing image with the position of the robot recorded by the robot itself. Meanwhile, the position of the center of the sensor in the tool frame of the robot can be calibrated based on the rotation motion.

In some embodiments, the method may further comprise triggering the robot to perform the second motion including a plurality of sub-motions with different motion frequencies.

In some embodiments, determining the time delay may comprise determining a first part of the second feedback information associated with a first sub-motion of the second motion and a first part of the second sensing information associated with the first sub-motion, the first sub-motion having a first motion frequency; determining a second part of the second feedback information associated with a second sub-motion of the second motion and a second part of the second sensing information associated with the second sub-motion, the second sub-motion having a second motion frequency different from the first motion frequency; determining, based on the association, the first motion frequency and the second motion frequency, a first phase difference between the first part of the second feedback information and the first part of the second sensing information and a second phase difference between the second part of the second feedback information and the second part of the second sensing information; and determining the time delay based on the first phase difference and the second phase difference.

The characteristic data of the sensor and the robot feedback are collected in a plurality of motions with different frequencies. Since each frequency of the motion has a peak amplitude in the frequency domain, a set of delays of the phase value between the robot feedback and the image feedback of the sensor will be recorded. Therefore, the delay of the sensor can be estimated based on the set of phase differences.

In some embodiments, the method may further comprise calibrating the second sensing information based on the time delay; and determining a target position to be reached by the robot based on the second feedback information and the calibrated second sensing information.

In some embodiments, the method may further comprise determining the recording time point based on the sensing time point and the time delay; determining a further recording time point at which a second reference position of the robot after the second motion is recorded by the robot; determining a third reference position of the robot recorded by the robot at the recording time point based on the second feedback information, the further recording time point and the second reference position; and determining a target position to be reached by the robot based on the third reference position and the sensing position of the robot.

In this way, a satisfied prediction result for the target position of the robot can be achieved, which may further improve the performance of the servo system.

In a second aspect, an electronic device is provided. The device comprise a processing unit and a memory coupled to the processing unit and having instructions stored thereon, the instructions, when executed by the processing unit, causing the device to execute acts of determining a first reference position of a robot in a robot coordinate system based on first feedback information received from the robot, the robot obtaining the first feedback information by recording a first motion of the robot; determining an association between the first reference position and first sensing information receive from a sensor, the sensor obtaining the first sensing information by sensing the first motion; receiving, from the robot, second feedback information associated with a second motion of the robot and, from the sensor, second sensing information associated with the second motion; and determining, based on the association, the second feedback information and the second sensing information, a time delay between a sensing time point when a sensing position of the robot in the second motion is sensed by the sensor and a recording time point when the sensing position is recorded by the robot in the second motion.

In some embodiments, the acts further comprising triggering the robot to perform the first motion including at least one of an orthogonal motion and a rotation motion.

In some embodiments, determining the association may comprise obtaining a first set of coordinate parameters in the robot coordinate system from the first feedback information, the first set of coordinate parameters representing the first reference position of the robot; determining a set of characteristic data associated with the robot from the first sensing information; and determining the association between the first set of coordinate parameters and the set of characteristic data.

In some embodiments, the acts further comprising triggering the robot to perform the second motion including a plurality of sub-motions with different motion frequencies.

In some embodiments, determining the time delay may comprise determining a first part of the second feedback information associated with a first sub-motion of the second motion and a first part of the second sensing information associated with the first sub-motion, the first sub-motion having a first motion frequency; determining a second part of the second feedback information associated with a second sub-motion of the second motion and a second part of the second sensing information associated with the second sub-motion, the second sub-motion having a second motion frequency different from the first motion frequency; determining, based on the association, the first motion frequency and the second motion frequency, a first phase difference between the first part of the second feedback information and the first part of the second sensing information and a second phase difference between the second part of the second feedback information and the second part of the second sensing information; and determining the time delay based on the first phase difference and the second phase difference.

In some embodiments, the acts further comprising calibrating the second sensing information based on the time delay; and determining a target position to be reached by the robot based on the second feedback information and the calibrated second sensing information.

In some embodiments, the acts further comprising determining the recording time point based on the sensing time point and the time delay; determining a further recording time point at which a second reference position of the robot after the second motion is recorded by the robot; determining a third reference position of the robot recorded by the robot at the recording time point based on the second feedback information, the further recording time point and the second reference position; and determining a target position to be reached by the robot based on the third reference position and the sensing position of the robot.

In a third aspect, a system is provided. The system comprises a robot configured to be triggered to perform a first motion and a second motion and record the first and the second motions; a sensor configured to sensing the first and the second motions; a timer coupled to the robot and the sensor and configured to stamp a first plurality of recording time points for second feedback information associated with the second motion and a second plurality of sensing time points for second sensing information associated with the second motion; and a calibrator, coupled to the robot and the sensor and configured to perform the acts of the first aspect.

In a fourth aspect, a computer readable medium is provided. The computer readable medium comprises program instructions for causing an electronic device to perform at least the acts of the first aspect.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, same reference numerals usually represent same components.

DETAILED DESCRIPTION

Figure 1:
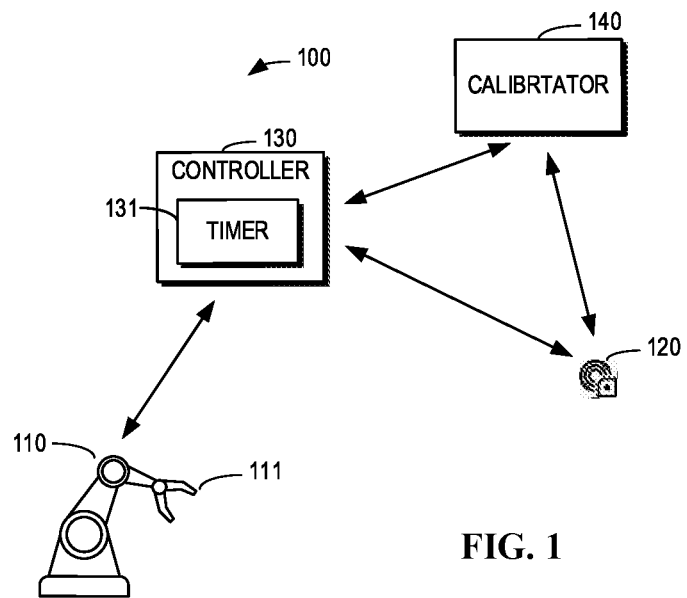
FIG. 1 shows an example operating environment in which embodiments of the present disclosure may be implemented.

The present disclosure will now be discussed with reference to several example embodiments. It is to be understood these embodiments are discussed only for the purpose of enabling those skilled persons in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the figures. Other definitions, explicit and implicit, may be included below.

As described above, a vision-guided motion is an effective technical means in automatic control, which improves the flexibility of the process of the control. A calibration procedure is one of the important aspects for the vision-guide motion. An expected calibration procedure may provide an accurate conversion between image data and robot motion.

FIG. 1 shows an example operating environment in which embodiments of the present disclosure may be implemented. As shown in FIG. 1, the operating environment 100 comprises a robot 110, which is coupled to a robot controller 130. The robot control 130 may trigger a motion of the robot and record feedback data associated with the motion. For example, the feedback data may be referred to a set of coordinate parameters of a terminal joint 111 of the robot 110 in a robot coordinate system during the motion.

Further, operating environment 100 may comprise a sensor. The sensor 120 may sense the gesture or the position of the robot and/or a position relationship between the robot and a target position to be reached by the robot. It is to be understood that the number of sensors shown in FIG. 1 is given for the purpose of illustration without suggesting any limitations. The operating environment 10 may include any suitable number of sensors.

In some embodiments, the sensors 120 can be a camera. Based on the data provided by the camera, the calibrator 140 may extract some pixel or feature pattern associated with the position of the robot and estimate a position which the robot should be reached in a subsequence action.

The operating environment 100 may also comprise a calibrator 140. The sensor 120 may transmit the sensing data to the calibrator 140. The robot 110 may also transmit its own feedback data to the calibrator 140. Furthermore, the robot controller 130 may comprise a timer 131. The timer 131 may timestamp the feedback data of the robot and also timestamps the sensing data of the sensor 120, when the sensor 130 informs the robot controller 130 that sensing data associated with the motion of the robot is obtained. Before the transmission of the sensing data to the calibrator 140 of the operating environment 100, the sensing data may be marked with the timestamp generated by the robot controller 130.

As known, there may be a delay of sensor, which may cause a time delay between a time point when a position is sensed by the sensor and a further time point when the robot reaches this position. Thus, the sensing data should be calibrated and compensated, for example, in the calibrator 140, before an estimation procedure using the sensing data.

A conventional way for the calibration procedure may require a calibration of inner parameters of the sensor 120 including the distortion, the focus and the image center of the sensor 120. Furthermore, a further calibration of the external parameter of the sensor 120 including the position and orientation of the sensor 120 in a tool coordinate system or a world coordinate system.

Figure 2:
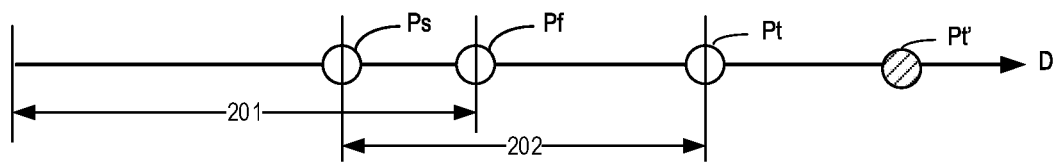
FIG. 2 shows a schematic diagram of a prediction of the target position.

The conventional calibrator may only focus on the conversion between the image provided by the sensor and robot motion. However, in a visual servo applications, the time delay of sensor is an important factor which may influence the performance of servo. FIG. 2 shows a schematic diagram of a prediction of the target position.

For example, as shown in FIG. 2, the sensor 120 takes photo when the robot 110 is moving along with a direction D. In a time point, the feedback data 201 of the robot 110 may indicate that the robot 110 reaches a reference position Pf while the sensing data 202 of the sensor 120 may indicate that a relationship between a sensing position Ps and a target point Pt. It can be seen that the reference position Pf and the sensing position Ps are different. When an estimation of the target position is performed by using the feedback data 201 and the sensing data 202, an error result may be obtained. For example, a false target position Pt' may be obtained. This will cause overshot and impair the stability of the system.

Therefore, a method is provided for calibrating and compensating the delay of the sensor in the embodiments according the present disclosure. In this way, the delay of the sensor could be calibrated and compensated in an expected way.

Figure 3:
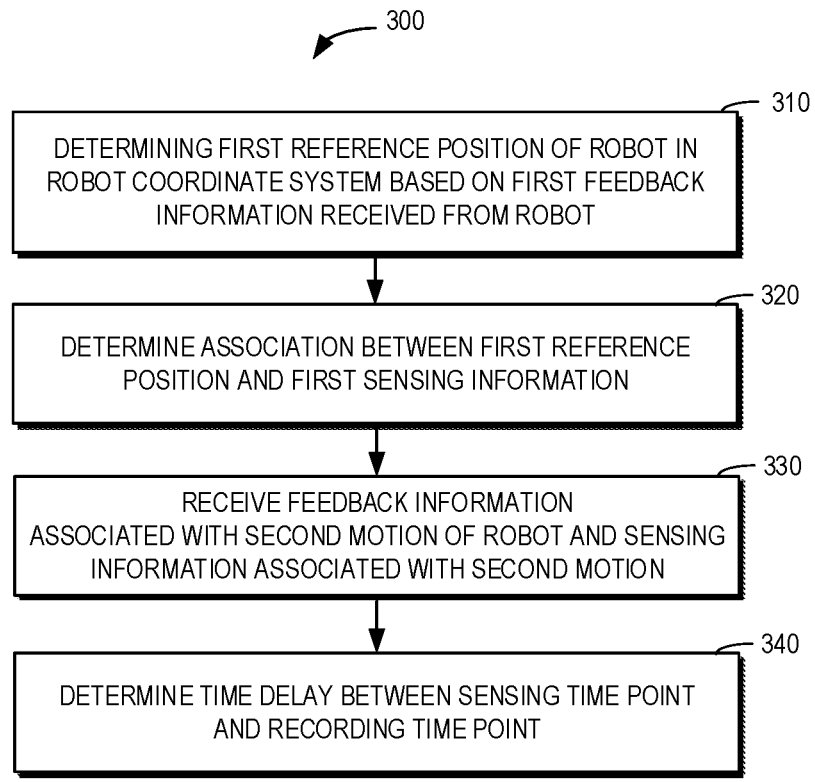
FIG. 3 shows a flowchart illustrating a method for time calibration according to embodiments of the present disclosure.

Principle and implementations of the present disclosure will be described in detail below with reference to FIGS. 3 to 6. FIG. 3 shows a flowchart illustrating a method 300 for time calibration according to embodiments of the present disclosure. For the purpose of discussion, the method 300 will be described with reference to FIG. 1. It would be appreciated that although the method 300 has been described in the operating environment 100 of FIG. 1, the method 300 may be likewise applied to other operating environments.

At 310, the calibrator 140 determines a first reference position of a robot in a robot coordinate system based on first feedback information received from the robot. The robot may obtain the first feedback information by recording a first motion of the robot.

For an industrial robot, one or more tools may be installed on the robot 110 to operate an object. To describe the tool in a space, a coordinate system on the tool, namely the tool coordinate system (TCS) may be defined and the origin of the tool coordinate system may be considered as a robot Tool Center Point (TCP). In the TCS, six degrees of freedom or six pieces of information are typically required to completely define the pose of the end joint of the robot, because it can move along three directions in a space and also rotate around the three directions.

Figure 4:
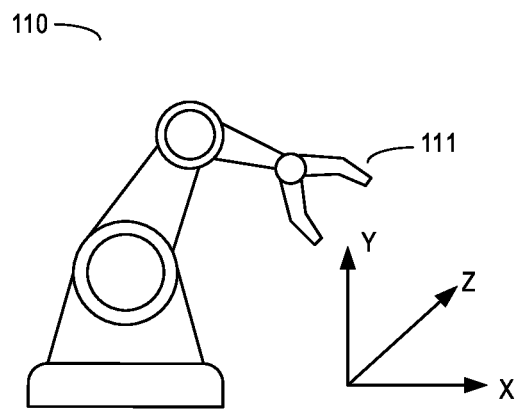
FIG. 4 shows a schematic diagram of a motion of the robot according to embodiments of the present disclosure.

FIG. 4 shows a schematic diagram of degrees of freedom for a motion of the robot according to embodiments of the present disclosure. For example, as shown in FIG. 4, the terminal joint 111 of the robot 110 may be triggered to perform an orthogonal motion along with any of the directions X, Y and Z. For example, the terminal joint 111 of the robot 110 may also be triggered to perform a rotation motion around any of the directions X, Y and Z.

In some embodiments, after the first motion, the calibrator 140 may determine a first set of coordinate parameters in the robot coordinate system based on first position reference information received from the robot 110. The first set of coordinate parameters may represent the first reference position of the robot 100 after the first motion.

At 320, the calibrator 140 determines an association between the first reference position and first sensing information receive from a sensor. The sensor may obtain the first sensing information by sensing the first motion.

In some embodiments, the first sensing information may be referred to a set of images of the robot during the first motion of the robot. Specifically, if the robot 110 may be triggered to perform an orthogonal motion along with any of the directions X, Y and Z, the robot 110 may move a distance at each step and then stop to record the robot feedback. Meanwhile, the sensor 120 may also record the images after each step in the motion. Also, if the robot 110 may be triggered to perform a rotation motion around any of the directions X, Y and Z, the robot nay rotate an angle at each step and then stop to record the robot feedback. Meanwhile, the sensor 120 may also record the images after each step in the motion.

In some embodiments, the calibrator 140 may determine a set of characteristic data associated with the robot from the first sensing information. In a case that the sensor is a camera, the characteristic data may be referred to a plurality of pixel in the image captured by the sensor. The calibrator 140 may determine the mapping between a plurality of pixel in the image captured by the sensor and the first set of coordinate parameters in the robot coordinate system and determine the association based on the mapping.

As another option, the sensor may be referred to a laser sensor and the first sensing information may be referred to as an optoelectronic signal. In this case, the calibrator 140 may determine the mapping between a change of current/voltage of the optoelectronic signal in the sensing procedure and a reference position of the robot represented by the first set of coordinate parameters in the robot coordinate system. The calibrator may then determine the association based on the mapping.

Then the robot may be triggered to perform a second motion. For example, the second motion may include several sine curve motions with different frequencies. Further referring to FIG. 3, at 330, the calibrator 140 receives, from the robot 110, second feedback information associated with a second motion of the robot 110 and receives, from the sensor 120, second sensing information associated with the second motion of the robot.

As mentioned above, in some embodiments, the second feedback information may be referred to a set of coordinate parameters of a terminal joint of the robot 110 in a coordinate system of the robot 110 recorded by the robot controller 130 in a first time period in a process of the second motion of the robot. For example, parameters of the TCP may be considered as the second feedback information.

In some embodiments, the second sensing information may be referred to as a set of images captured by the sensor in a second time period in a process of the second motion of the robot. The set of images may reflect a set of position relationships between the robot 210 and a feature position in coordinate system of the sensor 211. The second time period may be overlapped with the first time period, during which the second feedback information is recorded by the robot controller 130. Both the second feedback information and the second sensing information may be labeled with a time stamp by a common timer 131.

Further, as shown in FIG. 3, at 340, the calibrator 140 may determine a time delay between a sensing time point and a recording time point based on the determined association between a reference position of a robot 110 in the robot coordinate system and a sensing position of the robot in the sensor coordinate system, the second feedback information and the second sensing information. At the sensing time point, the sensor 120 may sense the robot 110 reaches a sensing position, while at the recording time point, the robot 110 may record the robot reaches the sensing position.

As described above, in the second motion, the robot 110 may be triggered to a plurality of sub-motions with different frequencies. The sub-motions may be referred to as sine curve motions. That is, the trajectory formed by the terminal joint of the robot in a sub-motion is a sine curve.

In some embodiments, the calibrator 140 may determine a first part of the second feedback information associated with a first sub-motion of the second motion and a first part of the second sensing information associated with the first sub-motion. The first sub-motion may have a first motion frequency. The calibrator 140 may further determine a second part of the second feedback information associated with a second sub-motion of the second motion and a second part of the second sensing information associated with the second sub-motion. The second sub-motion may have a second motion frequency different from the first motion frequency.

The calibrator 140 may further determine, based on the association, the first motion frequency and the second motion frequency, a first phase difference between the first part of the second feedback information and the first part of the second sensing information and a second phase difference between the second part of the second feedback information and the second part of the second sensing information and determine the time delay based on the first phase difference and the second phase difference.

Figure 5A:
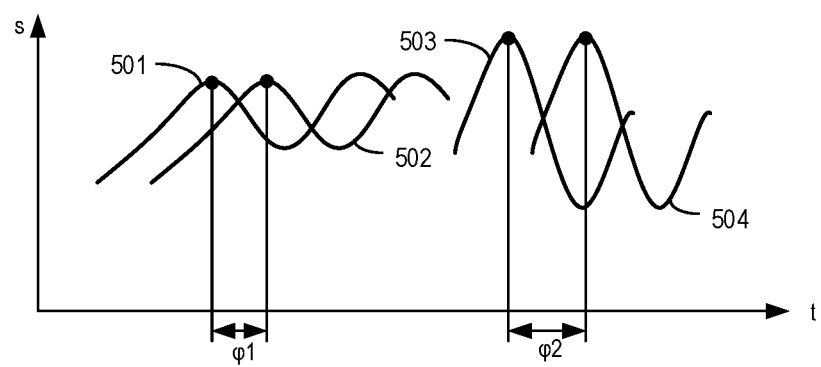
FIG. 5A shows example phase differences between feedback data and sensing data associated with a set of motions with different motion frequencies according to embodiments of the present disclosure.
Figure 5B:
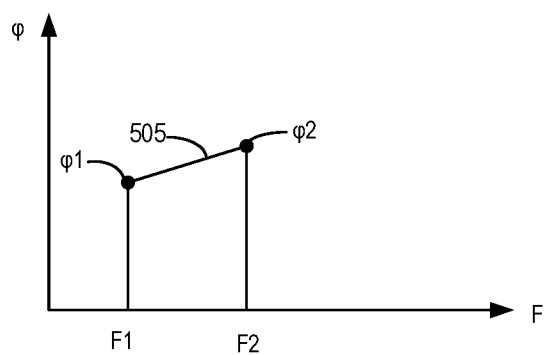
FIG. 5B shows a schematic curve showing a changing trends of values of phase differences according to embodiments of the present disclosure.

FIGS. 5A-5B show example phase differences between feedback data and sensing data associated with a set of motions with different motion frequencies according to embodiments of the present disclosure. With reference to FIGS. 5A and 5B, the process for determining the phase difference may be further described in detail.

A first part of the second feedback information associated with a first sub-motion and a first part of the second sensing information associated with the first sub-motion may be selected. The first sub-motion may have a first motion frequency. Also, a second part of the second feedback information associated with a second sub-motion and a second part of the second sensing information associated with the second sub-motion may be selected. For those parts of the second feedback information and second sensing information, each recording time points associated with the second feedback information and each sensing time points associated with the second sensing information may be labeled with time stamps generated by timer 131.

In some embodiments, the Fourier series of the first part of the second feedback information and the first part of the second sensing information may be computed and a further Fourier series of the second part of the second feedback information and the second part of the second sensing information. Each frequency of the sub-motion may have peak amplitude in the frequency domain. The phase values of the first and second motion frequencies may be recorded for each part of the second feedback information and second sensing information.

In FIG. 5A, for example, the curve 501 may be referred to as a first part of the second feedback information associated with a first sub-motion and the curve 502 may be a first part of the second sensing information associated with the first sub-motion. Further, the curve 503 may be referred to as a second part of the second feedback information associated with a second sub-motion and the curve 502 may be a second part of the second sensing information associated with the second sub-motion. It is to be understood that the second motion may comprise other sub-motions, which are not shown in FIG. 5A.

The delay of the phase value between the second feedback information and the second sensing information may be recorded for each sub-motion. As shown, a delay of phase value between the curve 501 and 502 may be considered as a first phase difference φ1 and a delay of phase value between the curve 503 and 504 may be considered as a second phase difference φ2. That is, each frequency of motion may have a value of phase delay. As shown in FIG. 5B, the slope $K_{phase}$ of a curve 505 may be obtained from the value of phase differences φ1 and φ2. The delay $T_{delay}$ may be estimated by regressing the slope $K_{phase}$ as below:

$$T_{delay} = \frac{K_{phase}}{2\pi} \quad (1)$$

After obtaining the delay of the sensor 120, the sensing data can be compensated according to the motion command sent by the calibrator 140. For example, the timestamp and value of the second feedback information may be recorded. As the robot 110 can provide high frequency feedback, the position of the robot 100 when the sensor samples the image can be estimated by a repressor in the calibrator 140.

In some embodiments, the calibrator 140 may determine the recording time point when the sensing position is recorded by the robot in the second motion based on the sensing time point and the time delay. The calibrator 140 may also determine a further recording time point at which a second reference position of the robot 110 after the second motion is recorded by the robot 110. Further, based on the second feedback information, the further recording time point and the second reference position, the calibrator 140 may determine a third reference position of the robot recorded by the robot at the recording time point, i.e. the position of the robot when the sensor samples the image. The calibrator 140 may determine a target position to be reached by the robot 110 based on the third reference position and the sensing position of the robot 110 sensed by the sensor. In this way, a satisfied prediction result for the target position of the robot can be achieved, which may further improve the performance of the servo system.

Figure 6:
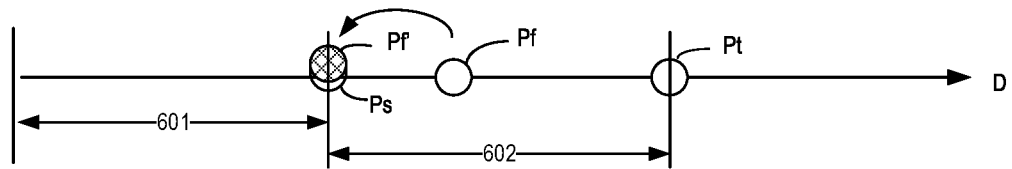
FIG. 6 shows a schematic diagram of a prediction of the target position according to embodiments of the present disclosure.

FIG. 6 shows a schematic curve showing a changing trend of values of phase differences according to embodiments of the present disclosure. As shown, second feedback information 601 about a regressed position Pf may be determined based on the time delay and the second feedback information about the position Pf. With the second sensing information 602, a target position Pt may be determined.

In some embodiments, the calibrator 140 may also generate a command, to cause the robot to move towards to the estimated target position. For example, the robot may perform a certain operation at the target position, e.g. capturing an object.

In this way, a time difference between a sensing time point and a recording time point can be determined. The time point when the robot reaches a sensing position may be recorded by a vision sensor senses as a sensing time point. The recording time point may characterize an actual time point when the robot reaches the sensing position. Therefore, the error between a position of the robot indicated in the sensing image and the actual position of the robot may be eliminated, which may lead an accurate subsequent estimation procedure.

In some embodiments, a system for time calibration is provided. As shown in FIG. 1, the system comprises a robot 110 configured to be triggered to perform a first motion and a second motion and record the first and the second motions; a sensor 120 configured to sensing the first and the second motions. The system may further comprises a timer 131 coupled to the robot 110 and the sensor 120 and configured to stamp a first plurality of recording time points for second feedback information associated with the second motion and a second plurality of sensing time points for second sensing information associated with the second motion. The system may comprise a calibrator 140 coupled to the robot 110 and the sensor 120 and configured to perform any acts of the method 300 as shown in FIG. 3.

Figure 7:
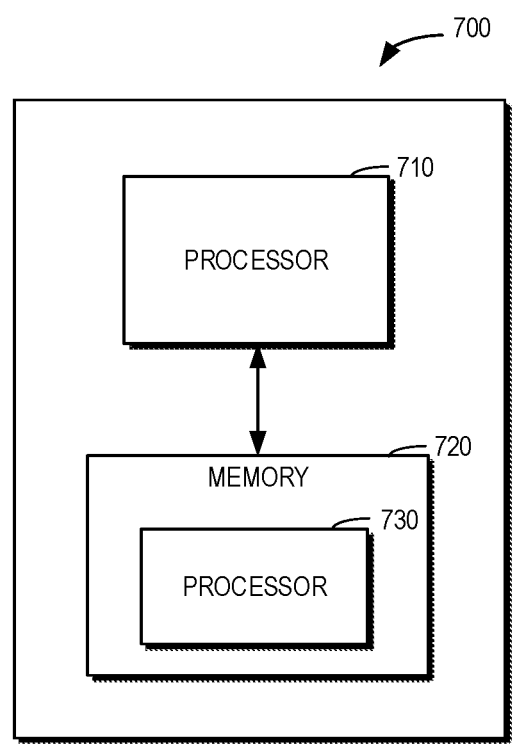
FIG. 7 shows a block diagram of an example computer readable medium in accordance with some example embodiments of the present disclosure.

FIG. 7 is a simplified block diagram of a device 700 that is suitable for implementing embodiments of the present disclosure. The device 700 may be provided to implement the method 300 shown in FIG. 3. As illustrated in FIG. 7, the device 700 may comprise a computer processor 710 coupled to a computer-readable memory unit 720, and the memory unit 720 comprises instructions 722. When executed by the computer processor 710, the instructions 722 may implement the method for operating the robot as described in the preceding paragraphs, and details will be omitted hereinafter.

In some embodiments of the present disclosure, a computer readable medium for simulating the at least one object in the manufacturing line is provided. The computer readable medium has instructions stored thereon, and the instructions, when executed on at least one processor, may cause at least one processor to perform the method for operating the robot as described in the preceding paragraphs, and details will be omitted hereinafter.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 3. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for time synchronization comprising:
   determining a first reference position of a robot in a robot coordinate system based on first feedback information received from the robot, the robot obtaining the first feedback information by recording a first motion of the robot;
   determining an association between the first reference position and a first sensing information received from a sensor, the sensor obtaining the first sensing information by sensing the first motion;
   triggering the robot to perform a second motion;
   receiving, from the robot, a second feedback information obtained by recording the second motion of the robot and, from the sensor, a second sensing information obtained by sensing the second motion; and
   determining a time delay between a sensing time point when a sensing position of the robot in the second motion is sensed by the sensor and a recording time point when the sensing position is recorded by the robot in the second motion based on the determined association, the second feedback information, and the second sensing information.

2. The method of claim 1, further comprising:
   triggering the robot to perform the first motion including at least one of:
   an orthogonal motion, or
   a rotation motion.

3. The method of claim 1, wherein determining the association comprises:
   obtaining a first set of coordinate parameters in the robot coordinate system from the first feedback information, the first set of coordinate parameters representing the first reference position of the robot;
   determining a set of characteristic data associated with the robot from the first sensing information; and
   determining the association between the first set of coordinate parameters and the set of characteristic data.

4. The method of claim 1,
   wherein the second motion includes a plurality of sub-motions with different motion frequencies.

5. The method of claim 1, wherein determining the time delay comprises:
   determining a first part of the second feedback information associated with a first sub-motion of the second motion and a first part of the second sensing information associated with the first sub-motion, the first sub-motion having a first motion frequency;
   determining a second part of the second feedback information associated with a second sub-motion of the second motion and a second part of the second sensing information associated with the second sub-motion, the second sub-motion having a second motion frequency different from the first motion frequency;
   determining, based on the determined association between the first reference position and the first sensing information, the first motion frequency, and the second motion frequency, a first phase difference between the first part of the second feedback information and the first part of the second sensing information and a second phase difference between the second part of the second feedback information and the second part of the second sensing information; and determining the time delay based on the first phase difference and the second phase difference.

6. The method of claim 1, further comprising:
determining the recording time point based on the sensing time point and the time delay;
determining a further recording time point at which a second reference position of the robot after the second motion is recorded by the robot;
determining a third reference position of the robot recorded by the robot at the recording time point based on the second feedback information, the further recording time point, and the second reference position; and
determining a target position to be reached by the robot based on the third reference position and the sensing position of the robot.

7. The method of claim 6, further comprising:
generating a command for triggering the robot to move towards to the target position.

8. An electronic device, comprising:
a processing unit; and
a memory coupled to the processing unit and having instructions stored thereon, the instructions, when executed by the processing unit, causing the electronic device to execute acts, the acts comprising:
determining a first reference position of a robot in a robot coordinate system based on a first feedback information received from the robot, the robot obtaining the first feedback information by recording a first motion of the robot;
determining an association between the first reference position and a first sensing information received from a sensor, the sensor obtaining the first sensing information by sensing the first motion;
triggering the robot to perform a second motion;
receiving, from the robot, a second feedback information associated with the second motion of the robot and, from the sensor, a second sensing information associated with the second motion; and
determining a time delay between a sensing time point when a sensing position of the robot in the second motion is sensed by the sensor and a recording time point when the sensing position is recorded by the robot in the second motion based on the determined association, the second feedback information, and the second sensing information.

9. The electronic device of claim 8, the acts further comprising:
triggering the robot to perform the first motion including at least one of:
an orthogonal motion, or
a rotation motion.

10. The electronic device of claim 8, wherein determining the association comprises:
obtaining a first set of coordinate parameters in the robot coordinate system from the first feedback information, the first set of coordinate parameters representing the first reference position of the robot;
determining a set of characteristic data associated with the robot from the first sensing information; and
determining the association between the first set of coordinate parameters and the set of characteristic data.

11. The electronic device of claim 8,
wherein triggering the robot to perform the second motion includes performing a plurality of sub-motions with different motion frequencies.

12. The electronic device of claim 8, wherein determining the time delay comprises:
determining a first part of the second feedback information associated with a first sub-motion of the second motion and a first part of the second sensing information associated with the first sub-motion, the first sub-motion having a first motion frequency;
determining a second part of the second feedback information associated with a second sub-motion of the second motion and a second part of the second sensing information associated with the second sub-motion, the second sub-motion having a second motion frequency different from the first motion frequency;
determining, based on the determined association between the first reference position and the first sensing information, the first motion frequency, and the second motion frequency, a first phase difference between the first part of the second feedback information and the first part of the second sensing information and a second phase difference between the second part of the second feedback information and the second part of the second sensing information; and
determining the time delay based on the first phase difference and the second phase difference.

13. The electronic device of claim 8, the acts further comprising:
determining the recording time point based on the sensing time point and the time delay;
determining a further recording time point at which a second reference position of the robot after the second motion is recorded by the robot;
determining a third reference position of the robot recorded by the robot at the recording time point based on the second feedback information, the further recording time point and the second reference position; and
determining a target position to be reached by the robot based on the third reference position and the sensing position of the robot.

14. The electronic device of claim 13, the acts further comprising:
generating a command for triggering the robot to move towards to the target position.

15. A system comprising:
a robot configured to be triggered to perform a first motion and a second motion and record the first motion and the second motion;
a sensor configured to sensing the first motion and the second motion;
a timer coupled to the robot and the sensor and configured to stamp a first plurality of recording time points for second feedback information associated with the second motion and a second plurality of sensing time points for second sensing information associated with the second motion; and
a calibrator, wherein the calibrator is coupled to the robot and the sensor, and the calibrator is configured to perform the method of claim 1.

16. A non-transitory computer readable medium comprising program instructions for causing an electric device to perform at least the method of claim 1.

17. A system comprising:
a robot configured to be triggered to perform a first motion and a second motion and record the first motion and the second motion;
a sensor configured to sensing the first motion and the second motion;
a timer coupled to the robot and the sensor and configured to stamp a first plurality of recording time points for second feedback information associated with the second motion and a second plurality of sensing time points for second sensing information associated with the second motion; and a calibrator, wherein the calibrator is coupled to the robot and the sensor, and the calibrator is configured to perform the method of claim 3.

18. A system comprising:

a robot configured to be triggered to perform a first motion and a second motion and record the first motion and the second motion;

a sensor configured to sensing the first motion and the second motion;

a timer coupled to the robot and the sensor and configured to stamp a first plurality of recording time points for second feedback information associated with the second motion and a second plurality of sensing time points for second sensing information associated with the second motion; and a calibrator, wherein the calibrator is coupled to the robot and the sensor, and the calibrator is configured to perform the method of claim 4.

19. A system comprising:

a robot configured to be triggered to perform a first motion and a second motion and record the first motion and the second motion;

a sensor configured to sensing the first motion and the second motion;

a timer coupled to the robot and the sensor and configured to stamp a first plurality of recording time points for second feedback information associated with the second motion and a second plurality of sensing time points for second sensing information associated with the second motion; and a calibrator, wherein the calibrator is coupled to the robot and the sensor, and the calibrator is configured to perform the method of claim 5.

20. A system comprising:

a robot configured to be triggered to perform a first motion and a second motion and record the first motion and the second motion;

a sensor configured to sensing the first motion and the second motion;

a timer coupled to the robot and the sensor and configured to stamp a first plurality of recording time points for second feedback information associated with the second motion and a second plurality of sensing time points for second sensing information associated with the second motion; and a calibrator, wherein the calibrator is coupled to the robot and the sensor, and the calibrator is configured to perform the method of claim 6.

* * * * *